United States Patent Office 3,649,625
Patented Mar. 14, 1972

3,649,625
PROCESS FOR PRODUCING α-AMINOBENZYL-
PENICILLIN
Leon John Heuser, Robbinsville, and Carl Francis Anderson, Milltown, N.J., assignors to E. R. Squibb & Sons, Inc., New York, N.Y.
No Drawing. Filed Nov. 12, 1969, Ser. No. 876,111
Int. Cl. C07d 99/14
U.S. Cl. 260—239.1
6 Claims

ABSTRACT OF THE DISCLOSURE

The production of α-aminobenzylpenicillin in a biphasic solvent system comprising a water immiscible halogenated hydrocarbon and water provides an improved method of synthesis in that better yields are obtained and a smaller volume of water, which must later be removed, is used.

BACKGROUND AND SUMMARY OF THE INVENTION

Various processes for the production of α-aminobenzylpenicillin, a wide spectrum antibiotic, in its various forms have been described. One process involves the reaction of the N-carboxy anhydride of phenyl glycine with 6-aminopenicillanic (6-APA) acid in an aqueous acidic medium. It has also been disclosed that 6-aminopenicillanic acid may be purified by treating an impure aqueous solution thereof with an amine of more than six carbon atoms and an aldehyde of more than four carbon atoms, recovering the amine salt of the Schiff's base formed thereby and converting this to purified 6-aminopenicillanic acid.

It has now been found that an improved process for the production of α-aminobenzylpenicillin results when the reaction product of 6-aminopenicillanic acid (6-APA) with certain aromatic aldehydes, especially in the form of a tertiary alkyl amine salt, is treated in a biphasic solvent system comprising water and a water immiscible halogenated hydrocarbon with the N-carboxy anhydride of phenylglycine. This new process provides a number of advantages. It obviates the need to purify 6-APA. Better yields are obtained. The water medium, which later must be removed, is used in much less volume.

DETAILED DESCRIPTION OF THE INVENTION

According to this invention α-aminobenzylpenicillin is produced by reacting the product formed from 6-aminopenicillanic acid, preferably in the form of a tertiary alkyl amine salt, and a reactive aromatic aldehyde, not including an α-hydroxy group, with the N-carboxy anhydride of phenylglycine in a biphasic solvent system comprising water and a water immiscible chlorinated alkane of not more than three chlorine atoms on a single carbon. The aldehyde reaction product is soluble in the organic solvent phase and the final product is soluble in and is recovered from the aqueous phase.

Reactive aromatic aldehydes which form an imine reaction product with 6-APA or its salt include benzaldehyde or simply substituted benzaldehydes wherein the phenyl group bears a methylenedioxy group, one to two halogens, especially chlorine or bromine, a lower alkoxy group, e.g., methoxy (which is preferred), ethoxy, etc. α-Hydroxy groups are excluded. Illustrative aldehydes in addition to benzaldehyde are p-anisaldehyde, o-, m- or p-chlorobenzaldehyde, piperonal, and the like.

Preferably the 6-APA used in this reaction is in the form of a salt formed with a tertiary alkyl amine in which the tertiary alkyl group has about 7 to 10 carbon atoms, like t-octylamine, t-nonylamine or the like, especially the first.

To form the biphasic solvent system a water immiscible chlorinated alkane of not more than four carbon atoms is used. There are no more than three chlorines on a single carbon. These include, for example, methylene chloride, which is preferred, chloroform, trichloroethylene, ethylene dichloride and the like.

The amount of water immiscible chlorinated hydrocarbon solvent used in the biphasic solvent system is about 30 to 70% the amount of water (v./v.), although under most circumstances approximately equal volumes of the two solvents give best results.

The reaction of the aldehyde-6-APA reaction product with the N-carboxy anhydride is best effected at an acid pH in the range of about 4 to 6, preferably about 4.5–5.5 and at a temperature just above the freezing point of water, e.g., in the range of about 1–15° C.

According to the preferred embodiment, a tertiary alkylamine salt of 6-APA, especially the t-octylamine salt, is reacted with the aromatic aldehyde, preferably benzaldehyde or anisaldehyde, in an aqueous solution, preferably at a pH of 6.0–9.0. The reaction product readily crystallizes from solution even when a solution of crude 6-APA is used as the starting material.

Then the reaction product of the aldehyde and 6-APA in the salt form, is dissolved in a mixture made up of approximately equal volumes of water and chlorinated hydrocarbon, especially methylene chloride, cooled to about 1 to 5° C. The aldehyde reaction product, which dissolves in the organic phase, is used in an amount approximately 0.1–0.2 molar with respect to the organic solvent. The pH is adjusted, e.g., with hydrochloric acid, to about 4.5 to 5.5. The N-carboxy anhydride of phenyl glycine, in an amount approximately equimolar in proportion to the aldehyde-6-APA reaction product, is added. After the reaction is complete, the insolubles are separated by filtration or centrifugation. After separation of the aqueous from the organic phase, the α-aminobenzylpenicillin product is recovered from the water phase.

Not only does this procedure result in superior yields of product, but, since the starting materials are soluble in the organic phase and the final product is soluble in the aqueous phase, recovery of the product is facilitated. A further advantage lies in the ability to use smaller amounts of water as solvent in relation to the final product, while still obtaining yields comparable with other processes. Since recovery of the product from the aqueous phase entails concentration of the water, the use of lesser amounts of water in what is a relatively dilute system provides obvious advantages in the recovery of the product on an economically feasible basis.

It will be appreciated that the final product occurs in optically active forms or racemic mixtures thereof which are traceable to the use of the D-, L- or racemic form of phenylglycerine and that all such forms are within the scope of this invention.

The N-carboxy anhydride may be formed for example by treating phenylglycine with phosgene in an inert solvent such as toluene, dioxane or tetrahydrofuran and isolating the product by concentration with hexane.

The following examples are illustrative of the invention. All temperatures are expressed on the centigrade scale. It will be appreciated that the L-form or racemic forms may be substituted for the optically active starting materials used by way of illustration below.

EXAMPLE 1

To 750 ml. of 6-APA hydrolysate (an aqueous mixture obtained in the enzymatic hydrolysis of penicillin G) at pH 8.0 (Est. 24.0 gms. 6-APA) are added 108 ml. of an aqueous tertiary octylamine hydrochloride solution (ca.

50% octylamine by weight). 25.5 ml. of benzaldehyde are added. A crystalline slurry forms and the pH drops to 6.3–6.5. The pH is maintained in the range 6.3–6.5 for two hours using tertiary octylamine. The mixture is stored at 5° C. for two hours. The 6-benzylidene-aminopenicillanic acid as the t-octylamine salt is filtered off and the crystals are washed with 75 ml. of water, then 75 ml. toluene. Yield 51.5 g. (colorimetric assay—981 γ/mg.).

125 g. D-α-phenylglycine are slurried in 1.25 liter tetrahydrofuran and warmed to 40° C. Phosgene is slowly introduced at a rate to maintain a temperature of 45–50° C. The addition is continued until the solution clears (2 hours. 10 minutes) and nitrogen is passed through to remove excess phosgene.

The solution is then concentrated under vacuum to 265 ml. and 800 ml. hexane is added slowly with rapid agitation over a period of 20 minutes. The slurry is kept at 5° C. in the cold room for 1 hour and then the crystals are filtered and washed with an additional 200 ml. hexane. The product is dried overnight under vacuum over phosphorous pentoxide. Yield 125.1 g.

A mixture of 250 ml. of methylene chloride and 250 ml. of water is cooled to 1° C. and 15 g. of 6-benzylidene-aminopenicillanic acid as the t-octylamine salt are added. After addition of 0.6 ml. benzaldehyde, the mixture is adjusted to 4.8 with 18% hydrochloric acid (5 minutes). 2.8 g. of N-carboxyanhydride of phenylglycine are added and the reaction continued for 5 minutes at this pH and temperature. A second 2.8 g. of N-carboxyanhydride of phenylglycine are added (total 5.6 g.—0.91 equiv.) over a period of 40 minutes and the reaction mixture stirred for an additional 1 hour at 1–3° C. and pH 4.7–4.9.

The insolubles (0.9 g.) are removed by centrifugation and the layers are separated. The aqueous layer, after storage for 1 hour at 5° C. is filtered.

The aqueous filtrate is then concentrated under vacuum to about 110 ml. and allowed to stand at 5° C. overnight. The crystalline product is filtered, washed with cold water and acetone and air dried. Yield: 7.1 g. 6-D-α-aminobenzyl-penicillin trihydrate (829 γ/mg. bioactivity).

EXAMPLE 2

6-APA-anisylidene-t-octylamine salt is formed by substituting anisaldehyde for benzaldehyde in the procedure of Example 1. To 7.5 gms. of 6-anisylidene-APA-t-octylamine salt are added 100 ml. of cold methylene chloride (1° C.) followed by 100 ml. of cold water. Then 0.3 ml. of anisaldehyde are added. A slurry forms and this mixture is adjusted to pH 4.8 (1:1 HCl). 2.86 gms. of the N-carboxy anhydride of D-phenylglycine are added over a period of ½ hour, maintaining the temperature and pH range of 4.8–4.9 during the reaction. The mixture is slurried for 1 hour after the N-carboxyanhydride is added. The mixture is centrifuged and the supernatant is separated. The insolubles are washed with 20 ml. of water, centrifuged and the wash is added to the main aqueous fraction. The aqueous layer (pH 4.8) is concentrated to one half its original volume and stored at 5° C. overnight. The crystalline 6-D-α-aminobenzylpenicillin trihydrate is washed with 10 ml. of cold water, then with 15 ml. acetone and air-dried. Yield: 3.1 gms. (85° γ/mg. bioactivity).

EXAMPLE 3

The piperonal derivative of 6-APA-t-octylamine salt is formed by substituting piperonal for benzaldehyde in the procedure of Example 1.

15.0 gms. of this salt is slurried in cold methylene chloride (1° C.) and cold water (250 ml. of each). The pH is adjusted to 4.8 with 1:1 HCl. 5.7 grams of N-carboxy anhydride of D-phenylglycine chloride in 40 ml. of methylene chloride over a period of 20 minutes. The reaction is continued for one additional hour at 4.8–4.9 and a temperature of 1° C. The mixture is then centrifuged. The aqueous supernatant liquid is decanted off and the insolubles are washed with water and the wash is added to the main fraction. The methylene chloride is removed from the aqueous portion and this solution is neutralized to pH 4.8 with sodium hydroxide and stored at 5° C. for one hour. The insolubles are filtered off (500 mgs.). The aqueous filtrate is concentrated to 90 ml. and stored at 5° C. overnight. The crystalline precipitate is filtered, washed with 15 ml. of cold water and 30 ml. of acetone. Yield: 7.3 gm. of 6-D-α-aminobenzylpenicillin trihydrate.

The following data illustrate the improved results obtained by the process of this invention. The first part of the table below shows the yield of 6-D-α-aminobenzylpenicillin trihydrate when the N-carboxy anhydride of D-phenylglycine is reacted with 6-APA-benzylidene-t-octylamine salt by the procedure of Example 1 utilizing the solvent system indicated. The second group of data show the yields obtained by reacting the N-carboxy anhydride of D-phenylglycine with 6-APA in similar solvent systems.

TABLE

| Starting material | Solvent (s) Wt. (gms.) | Solvent (s) Type | Vol. (ml.) | Yield of product Wt. (gms.) | Yield of product Percent |
|---|---|---|---|---|---|
| (1) 6-APA-benzylidene-tOA | 15 | H₂O | 250 | 2.75 | 19.5 |
| (2) 6-APA-benzylidene-tOA | 15 | H₂O | 500 | 2.95 | 21 |
| (3) 6-APA-benzylidene-tOA | 15 | {H₂O / CH₂Cl₂} | 250 / 250 | 7.1 | 45.8 |
| (4) 6-APA | 7.5 | H₂O | 250 | 2.95 | 21 |
| (5) 6-APA | 7.5 | H₂O | 450 | 3.6 | 27.5 |
| (6) 6-APA | 7.5 | {H₂O / CH₂Cl₂} | 250 / 250 | 2.1 | 15 |

The above data demonstrate that the reaction of the aldehyde reaction product in either 250 or 500 ml. of water alone gives 19.5% and 21% yields, respectively. In a mixed solvent system comprising 250 ml. each of water and methylene chloride the yields increase markedly to 48.5%. When 6-APA alone is used in either water or a mixed solvent the yields are 21%, 27.5% and 15%, respectively. No marked difference is evident between experiments 1, 2, 4, 5 and 6, but there is a significant difference in the results obtained in Experiment 3.

What is claimed is:

1. A process for the production of α-aminobenzylpenicillin which comprises reacting the product formed from 6-aminopenicillanic acid or tertiary alkyl amine salt thereof and benzaldehyde or substituted benzaldehyde wherein the benzaldehyde substituent is other than α-hydroxy group with the N-carboxyl anhydride of phenylglycine in a bisphasic solvent system comprising about 30% to 70% by volume of water and about 70% to 30% by volume of a water immiscible chlorinated alkane of not more than four carbon atoms and not more than three chlorine atoms on a single carbon, and separating the product from the aqueous phase.

2. A process as in claim 1 wherein the aromatic aldehyde is benzaldehyde.

3. A process as in claim 1 wherein the aromatic aldehyde is anisaldehyde.

4. A process as in claim 2 wherein the tertiary amine salt is t-octylamine and the chlorinated alkane is methylene chloride.

5. A process as in claim 3 wherein the tertiary amine salt is t-octylamine and the chlorinated alkane is methylene chloride.

6. A process as in claim 4 wherein the amount of methylene chloride is about 50% by volume of solvent phase.

References Cited

UNITED STATES PATENTS 3,206,455  9/1965  Alburn et al. _____ 260—239.1
3,248,387  4/1966  Alburn et al. _____ 260—239.1

NICHOLAS S. RIZZO, Primary Examiner

U.S. Cl. X.R.

424—271